L. G. COPEMAN.
ELECTRICALLY HEATED COOKER.
APPLICATION FILED MAY 7, 1910.

1,005,811.

Patented Oct. 17, 1911.

2 SHEETS—SHEET 1.

Witnesses

Inventor
Lloyd Groff Copeman
By
Att'ys

L. G. COPEMAN.
ELECTRICALLY HEATED COOKER.
APPLICATION FILED MAY 7, 1910.
1,005,811.
Patented Oct. 17, 1911.
2 SHEETS—SHEET 2.
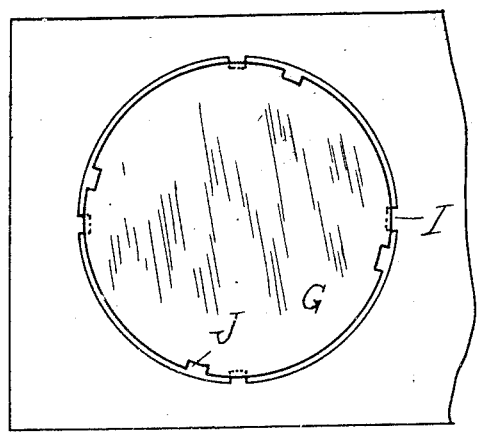
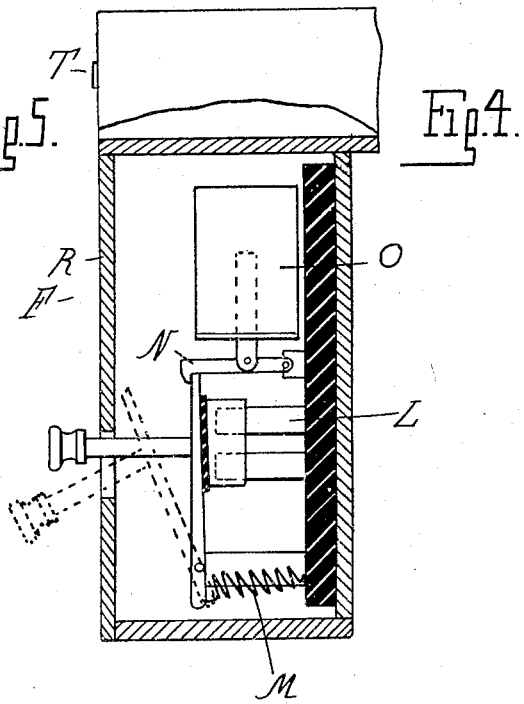
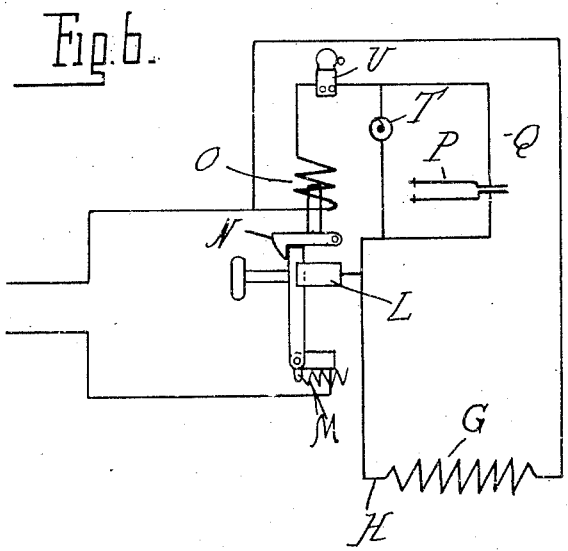
Witnesses:
Inventor:
Lloyd Groff Copeman

UNITED STATES PATENT OFFICE.

LLOYD G. COPEMAN, OF FLINT, MICHIGAN.

ELECTRICALLY-HEATED COOKER.

1,005,811.            Specification of Letters Patent.    Patented Oct. 17, 1911.

Application filed May 7, 1910. Serial No. 559,986.

*To all whom it may concern:*

Be it known that I, LLOYD GROFF COPEMAN, a citizen of the United States of America, residing at Flint, in the county of Genesee and State of Michigan, have invented certain new and useful Improvements in Electrically-Heated Cookers, of which the following is a specification, reference being had therein to the accompanying drawings.

The invention relates to cooking apparaus of that type commonly known as electric ovens, and in which heat originally stored in a suitable body within an insulated chamber continues the cooking of the food therein.

It is the object of the present invention—first, to provide means incorporated as a part of the apparatus for furnishing the initial heat; second, the automatic control for the heating means which effectually guards against overheating; third, the adaptation of the apparatus for use as a hot plate on which all of the ordinary cooking operations can be performed; fourth, the arrangement of a warming closet in the same case as the cooking receptacles and so as to receive heat indirectly therefrom.

With these objects in view, the invention consists in various features of construction as hereinafter set forth.

Figure 1:
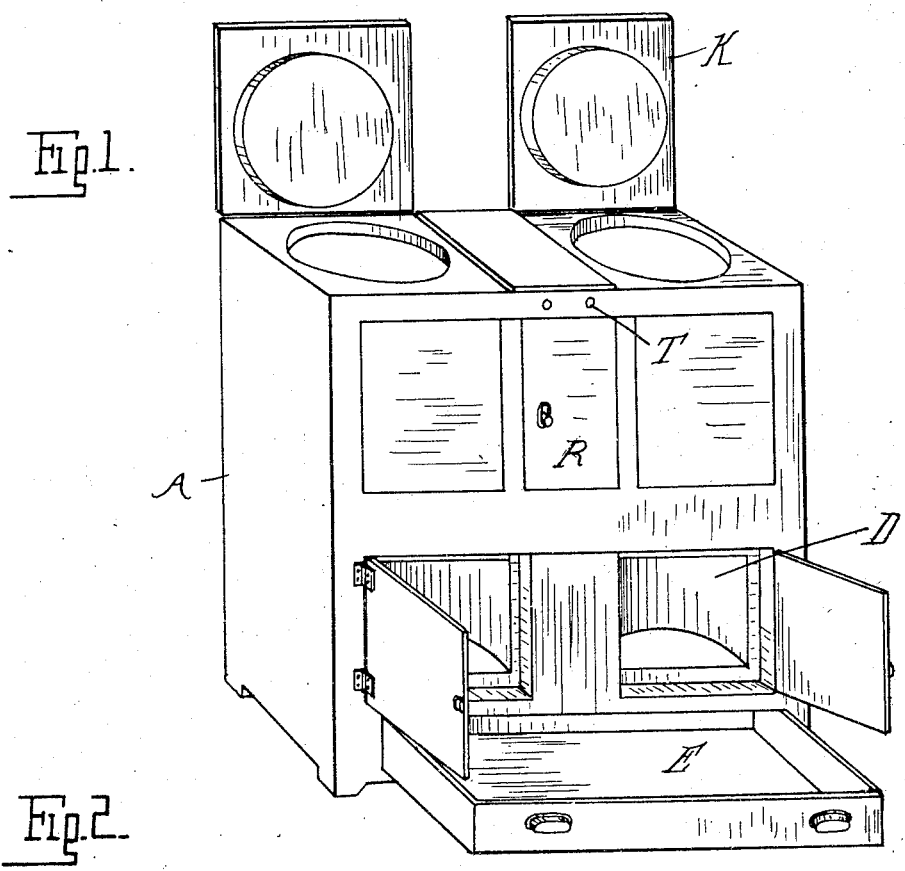
Figure 2:
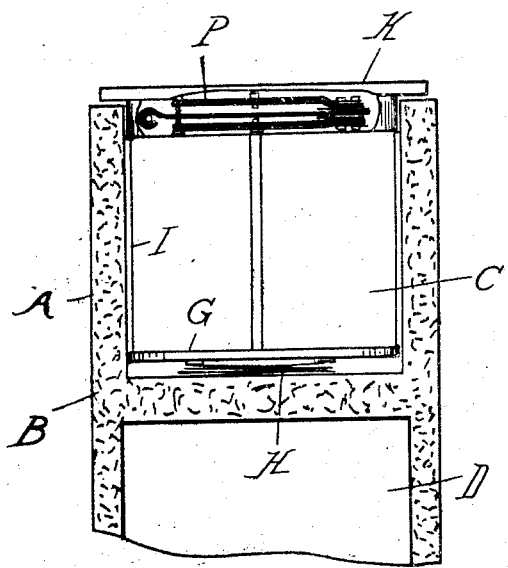
Figure 3:
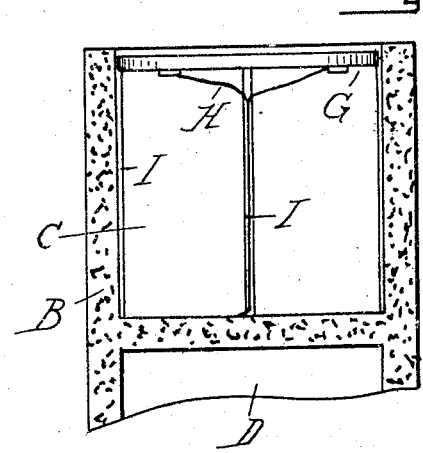

In the drawings—Figure 1 is a perspective view of the apparatus; Fig. 2 is a vertical section through the cooking compartment; Fig. 3 is a similar section showing the adjustment for use as a hot plate; Fig. 4 is a section through the compartment containing the control mechanism; Fig. 5 is a plan; and Fig. 6 is a diagram showing the arrangement of the electrical circuits.

In general construction, my apparatus comprises a suitable casing A within which the various compartments of the apparatus are arranged, the walls being hollow and filled with suitable heat insulating material B. In the specific construction shown, the apparatus is provided with two cooking chambers C, beneath each of which is a warming closet D, and still lower, a second warming closet or drawer E extending beneath both compartments. There is also a chamber F intermediate the cooking chambers C, in which the automatic electric switches are arranged. Each of the compartments C is provided with an electrical heating unit G preferably in the form of a flat disk of substantially the same area as the bottom of the receptacle. As the specific character and arrangement of the heating resistance in the unit forms no part of the present invention, it is not illustrated.

H are electrical conductors connecting with the unit which are arranged so as to permit of vertical adjustment of the unit within the receptacle C. This is preferably accomplished by employing a flexible conductor of sufficient length to permit the unit to be raised to the top of the receptacle, and when said unit is at the bottom of the receptacle this conductor will assume the shape of a coil.

The primary object of the adjustment of the unit is to permit of its employment as a hot plate. For this purpose a suitable support is provided for the unit near the upper end of the receptacle C preferably by arranging a plurality of vertical ribs I on the sides of said receptacle, with engaging notches J in the disk. Thus by raising the disk above the ribs and slightly turning it it may be permitted to rest upon the ends of the ribs which will support it in the proper position. This position is shown in Fig. 3, and the arrangement is such as to permit of using the unit as a hot plate for frying, boiling, or any of the usual operations.

When the apparatus is used for roasting or baking, the unit G is adjusted to its lower position, and the material to be cooked is placed in the receptacle C in suitable trays or holders (not shown). The lid K is then closed and, as this also forms a heat insulation, the loss of the heat from the receptacle will be slow. Inasmuch, however, as the generation of heat in the unit is constant, there is danger of overheating, which I have guarded against by the following construction: L are electric switches within the receptacle F controlling the electric circuits for the unit G. These switches are adapted to automatically open when released, and to this end are preferably provided with a spring M for throwing the blade. When the switch is closed, a latch N engages the movable member and prevents opening by the action of the spring. For releasing the latch an electro-magnet or solenoid O is arranged thereabove, and this magnet is controlled by a thermostatic switch P. The latter is preferably arranged in a hollow space within the lid K, and is so set that when the heat in the receptacle C reaches a predetermined temperature the thermostat will operate to close an electric circuit Q for energizing the solenoid or magnet O. As soon as this occurs, the latch will be withdrawn, which will permit the spring M to open the switch L, thereby cutting out the current from the unit G, and also breaking the circuit established through the solenoid circuit Q. The switch L and solenoid are arranged within the compartment F, which is normally closed by a front panel R, but the handles D for the switches project forward through a slot in this panel in a position for operation. The switches may thus be closed, but as the latch N automatically engages the opening of the switch, by means of the handle, is prevented.

It is sometimes desirable to cut out the heat without waiting for the operation of the thermostat, which I accomplish by providing circuit closers preferably in the form of push buttons T, which close a shunt around the thermostat in the solenoid circuit Q, and by energizing the latter causes the opening of the switch.

From the description given above, it will be understood that my apparatus not only serves the purpose of the ordinary fireless cooker, but is the equivalent of a kitchen range, on which all of the usual cooking operations may be performed. On the other hand, the conservation of the heat, due to the heat insulating material employed, reduces the cost of current to the minimum.

To call attention to the cutting out of the electric circuit automatically by the thermostat, I preferably arrange a bell or other signal U in the circuit Q, which will sound for an instant preceding the releasing of the switch L.

What I claim as my invention is:

1. The combination with a heat insulated chamber, a heating unit normally positioned within the lower portion of the chamber, the interior of said chamber and said unit being provided with interengaging portions to permit said unit to be supported in an elevated position in said chamber.

2. The combination with a heat insulated chamber, a heating unit normally positioned within the lower portion of said chamber, and means within the chamber for holding said unit in the upper portion of the chamber.

3. The combination with a casing, of a heat insulated chamber therein, an electrical heating unit within the chamber, automatically controlling mechanism for said heating unit arranged within the casing, and means actuating said automatic means from the exterior of the casing.

4. The combination with a casing having heat insulating walls, of a chamber within said casing opening at its upper end, a lid for closing said opening, an electric heating unit within said chamber adapted for arrangement at the lower end thereof, and a thermostat controlling the circuit of said heater arranged in said lid.

5. The combination with a casing having heat insulating walls, of a chamber within said casing open at its upper end, a lid for closing said opening to render said opening air tight, an electrical heater adjustable within said chamber, and means within the chamber for supporting said heater at the upper end of said chamber when said lid is removed to form a hot plate.

6. The combination with a casing having heat insulating walls, of a chamber within said casing, an electrical heating unit within said chamber, manually-operable means for closing the circuit in said heating unit, thermostatic-controlling means for opening said circuit, and manually-operable means also controlling said automatic means for opening the circuit.

7. The combination with a casing having heat insulating walls, of a plurality of chambers within said casing, an electrical heating unit within each chamber, and automatic controlling mechanism for said heating units arranged within said casing in the space intermediate said chambers and means for actuating said automatic means from the exterior of the casing.

8. The combination with an air tight casing having heat insulating walls, of a chamber within said casing, an electrical heater normally positioned in the lower portion of said chamber and adjustable vertically therein, and a flexible conductor connected to the bottom of said unit and passing out from the lower end of said chamber forming a portion of the electrical circuit, said chamber and said electrical heater being provided with interengaging portions to permit said heater to be supported in an elevated position in said chamber.

9. In a device of the character described, an open top cooking chamber provided with a plurality of vertically extending ribs therein terminating adjacent the top thereof, a heating unit adjustable within said chamber and provided with notches in the periphery thereof engaging the ribs extending from the wall of the chamber, and a lid for closing the top of the chamber.

In testimony whereof I affix my signature in presence of two witnesses.

LLOYD G. COPEMAN.

Witnesses:
F. P. WILDMAN,
R. W. SCHUMACHER.